UNITED STATES PATENT OFFICE.

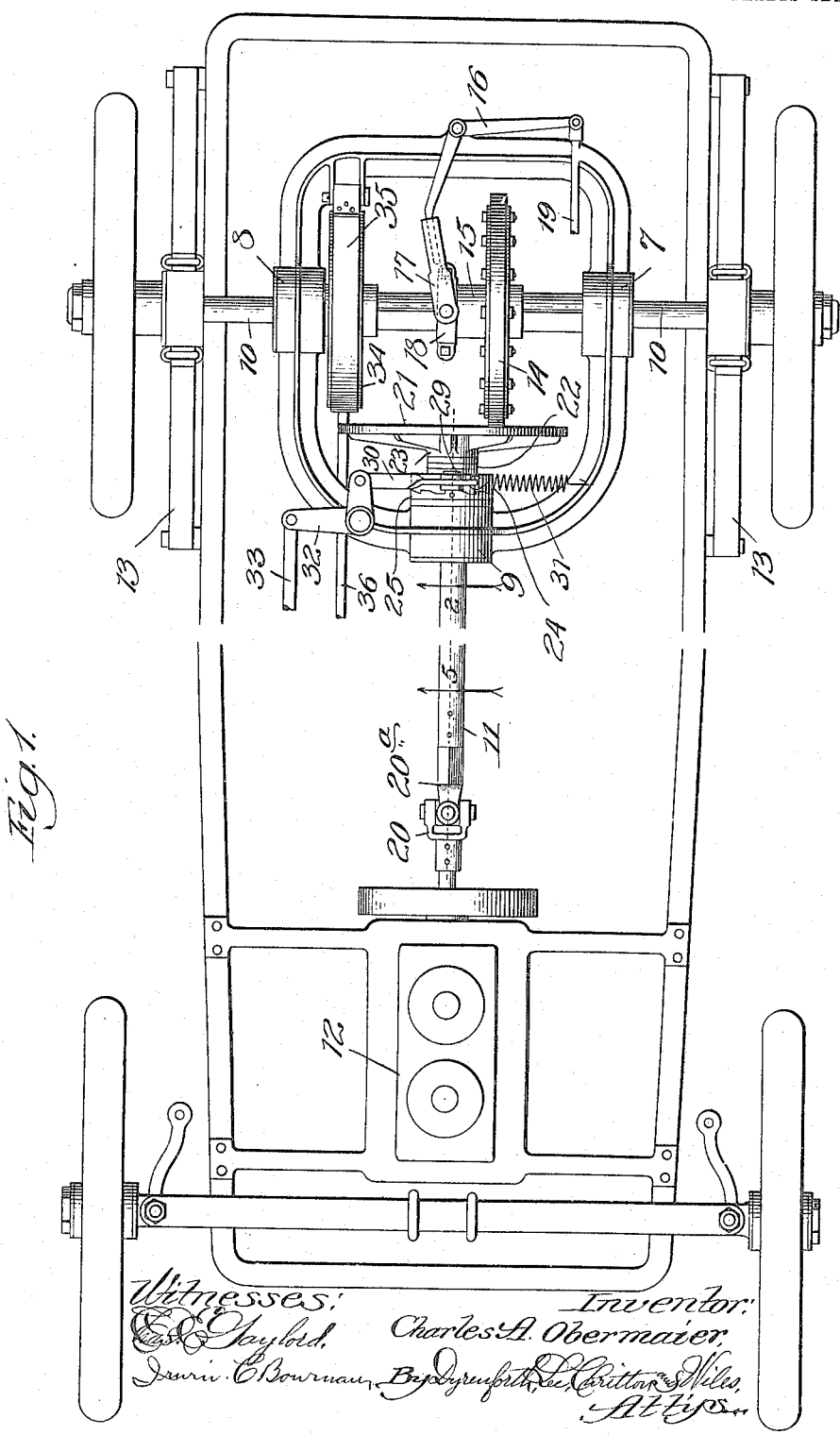

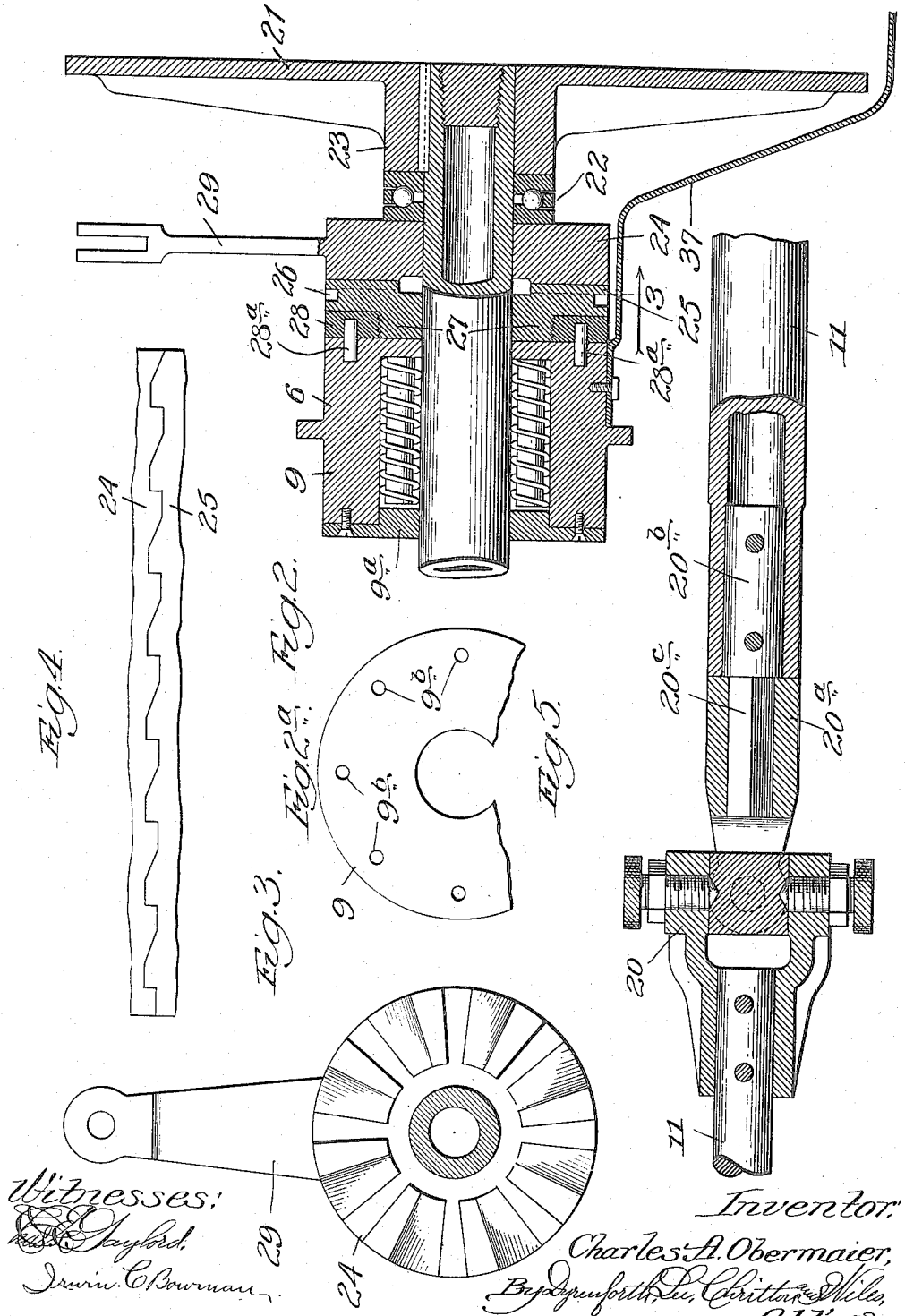

CHARLES A. OBERMAIER, OF CHICAGO, ILLINOIS.

FRICTION-DRIVE FOR MOTOR-VEHICLES.

1,128,715.   Specification of Letters Patent.   Patented Feb. 16, 1915.

Application filed October 20, 1913.   Serial No. 796,226.

*To all whom it may concern:*

Be it known that I, CHARLES A. OBERMAIER, a subject of the Emperor of Germany, residing at Chicago, in the county of Cook and State of Illinois, have invented a new and useful Improvement in Friction-Drives for Motor-Vehicles, of which the following is a specification.

My invention relates to an improvement in friction-drives, which I have devised more especially for light-weight motor-vehicles; and the primary object of my invention is to provide an effective direct rear-axle friction-drive, which shall dispense with all gears, chains or belts and thereby avoid the usual great loss of the transmission power, which such gearing causes, and eliminate all chain-noises.

In the accompanying drawings, Figure 1 is a broken plan view of a motor-vehicle equipped with my invention; Fig. 2 is an enlarged section on line 2, Fig. 1; Fig. 2ᵃ is a broken rear face view of the forward roller-bearing on the yoke; Fig. 3 is a section on line 3, Fig. 2; Fig. 4 is a broken developed view of the cam-device for throwing the friction-device into gear, and Fig. 5 is an enlarged section on line 5, Fig. 1.

The entire friction-drive is mounted on a three-point suspension-yoke 6, of the preferred form illustrated, supported at roller-bearings 7, 8 on the rear axle 10, and at its forward end at a similar bearing 9 on the shaft 11 of the motor 12 on the front end of the vehicle, the body of which is supported, as usual, by springs 13 on the rear axle. The roller-bearing construction is illustrated in Fig. 2, and comprises rollers thread-wound spirally and confined in their casing by a cap 9ᵃ fastened in place, as by screws. The axle 10 carries a friction-wheel 14 on a collar 15 longitudinally shiftable, for speed-changing, on the axle by a bell-crank 16 fulcrumed on the yoke, having a slip-joint connection, as shown in Fig. 1, of one of its arms with a finger 17 pivoted to a collar 18, in which the sleeve rotates, the other bell-crank arm having a rod-connection 19 leading to the forward end of the vehicle to be manipulated by a suitable lever (not shown). The motor-shaft contains a universal joint 20, and its rear tubular section is connected with the socketed member 20ᵃ of that joint by a pin 20ᵇ riveted in the tubular shaft-section and having an angular extension 20ᶜ fitting the socket. This flexible construction of the motor-shaft takes care of shaft shortening and lengthening due to the action of the springs, and the adjustment hereinafter described. The shaft 11 has keyed on its rear end a friction-disk 21 to coöperate with the wheel 14, and has a thrust-taking ball-bearing 22 interposed between the disk-hub 23 and the member 24 of a cam-device. This member is a disk loosely mounted on the shaft and having cam-teeth on its face opposing similar cam-teeth on the face of a disk 25 forming the companion-member. The member 25, which is recessed at 26 for the application of a wrench, is provided with a threaded hub 27 in a nut 28 having a pair of pins 28ᵃ on one face to register with sockets 9ᵇ in the opposing face of the bearing 9, and the nut is fastened against rotation by the pins 28ᵃ entering these sockets. One purpose of the cam-device is that of setting the friction-disk 21 with relation to the wheel 14 to compensate for wear on the periphery of the latter by a slight adjustment, merely of a small fraction of an inch, with relation to which the distance between pin-sockets 9ᵇ, which are uniformly spaced apart, is arranged. Thus, by turning the nut in the proper direction on the thread 27 just far enough to bring the pins on the nut into the next registration with sockets 9ᵇ, the disk 25 is advanced to the extent of one predetermined adjustment; and this turning of the nut is repeated, to produce a successive registration of the pins with sockets each time compensation for wear (say to the extent of one sixty-fourth of an inch) on the wheel 14 is required. As will be understood, preparatory to making one of these adjustments, the parts on the shaft in rear of the bearing 9 have to be loosened or taken off, and reassembled after each adjustment. The other purpose of the cam-device is to engage and disengage the disk 21 from the wheel 14. The normal relative positions of the two cam disks is such as to maintain the friction-members 21 and 14 in non-driving contact. For driving, the disk 24 is turned to ride the cams on its face against those on the opposing face of the disk 25, thereby advancing the disk 24 against the ball-bearing 22 to press the friction-disk 21 into driving contact with the friction-wheel. The disk 24 is provided for thus turning it, with an arm 29; and a link 30, held yieldingly in normal position by a spiral spring 31 connecting one end with the yoke, connects the arm, at its bifurcated end, with one arm of a bell-crank 32 fulcrumed on the yoke and having its other arm connected by a rod 33, leading to an operating lever (not shown) on the forward part of the vehicle in position accessible to the chauffeur.

A known form of brake is shown to be provided (Fig. 1), and consists of a wheel 34 on the rear axle engageable at its periphery by a band-spring 35 to be operated by a rod 36 leading to an operating lever (not shown) in accesible position on the forward part of the vehicle.

To protect the mechanism associated with the yoke from dust and dirt, the bottom of the yoke should be provided with a cover 37, as of sheet-metal.

By the construction thus described, the motor-power, as will be seen, is directly applied to the rear axle through the shaft 11 and friction-drive, thus to the point where it is needed, and all toothed gears, chains and belts are eliminated with the advantage of material gain in transmission-power and noiselessness; the entire friction-drive is supported at three points on a yoke, these points being comparable, in their relative positions, to the apexes of a triangle, thereby enabling the mechanism to be of great simplicity and its weight and cost to be reduced to the minimum; and it renders very simple the control of the vehicle, which may be started, stopped, reversed or changed in speed with either a slow or a quick movement of the controlling-devices, and without shock in changing the speed.

I realize that considerable variation is possible in the details of construction thus specifically shown and described, and I do not intend by illustrating a single, specific or preferred embodiment of my invention to be limited thereto; my intention being in the following claims to claim protection upon all the novelty there may be in my invention as broadly as the state of the art will permit.

What I claim as new and desire to secure by Letters Patent is:

1. In a motor-vehicle, a direct rear-axle friction-drive, comprising a yoke having two side bearings on the rear axle and a central forward bearing for the motor-shaft, which is extended thereto, a friction-disk on the rear end of the shaft, a friction-wheel on a sleeve shiftably supported on said axle and coöperating with said disk, a collar on the sleeve, a finger connected with the collar, a bell-crank fulcrumed on the yoke, having a connection of one arm with said finger, and a rod connected with the other arm for turning the bell-crank.

2. In a motor-vehicle, a direct rear-axle friction-drive, comprising a yoke supported on the rear axle and having a forward bearing provided with sockets, a flexibly-jointed extensible and contractible motor-shaft extended through said bearing, a friction-wheel on said axle, a friction-disk supported on the rear end of the shaft to coöperate with said wheel, a ball-bearing on the shaft engaging said disk, a cam-device comprising a cam-faced disk loosely supported on the shaft adjacent to said ball-bearing and provided with a spring-held arm, a second cam-faced disk fixed on the shaft to coöperate with said first-named disk and having a threaded hub, a nut surrounding said hub adjacent to said bearing and having pins entering said sockets, a bell crank fulcrumed on the yoke and having one arm linked to said disk-arm, and a rod connected with the other arm of the bell-crank for turning the latter.

CHARLES A. OBERMAIER.

In presence of—
L. Heislar,
A. C. Fischer.

Copies of this patent may be obtained for five cents each, by addressing the "Commissioner of Patents, Washington, D. C."